(12) United States Patent
Lin

(10) Patent No.: US 7,631,398 B1
(45) Date of Patent: Dec. 15, 2009

(54) CAM DEVICE FOR A HINGE ASSEMBLY

(75) Inventor: Chao-Chi Lin, Taichung (TW)

(73) Assignee: Leohab Enterprise Co., Ltd., Taichung (TW)

( * ) Notice: Subject to any disclaimer, the term of this patent is extended or adjusted under 35 U.S.C. 154(b) by 0 days.

(21) Appl. No.: 12/246,546

(22) Filed: Oct. 7, 2008

(51) Int. Cl.
*E05C 17/64* (2006.01)
(52) U.S. Cl. ............................ 16/341; 16/303; 16/330
(58) Field of Classification Search .................. 16/341, 16/342, 374, 303, 330, 334, 337; 361/679.27; 248/920–923
See application file for complete search history.

(56) References Cited

U.S. PATENT DOCUMENTS

| 6,862,779 | B1 * | 3/2005 | Lu et al. ....................... | 16/340 |
| 7,222,396 | B2 * | 5/2007 | Lu et al. ....................... | 16/340 |
| 7,430,786 | B1 * | 10/2008 | Jian ............................. | 16/330 |
| 7,506,408 | B2 * | 3/2009 | Lu et al. ....................... | 16/340 |
| 7,520,026 | B1 * | 4/2009 | Lin .............................. | 16/337 |
| 7,533,446 | B1 * | 5/2009 | Lin .............................. | 16/330 |
| 7,536,749 | B2 * | 5/2009 | Lu et al. ....................... | 16/330 |

FOREIGN PATENT DOCUMENTS

TW M244497 9/1993

* cited by examiner

*Primary Examiner*—William L. Miller
(74) *Attorney, Agent, or Firm*—Alan Kamrath; Kamrath & Associates PA

(57) ABSTRACT

A cam device includes a first member including a recessed first engaging portion on an inner section, a recessed second engaging portion on an outer section, and recessed third and fourth engaging portions extending from the inner section to the outer section. Further, a second member includes a ridged first engaging portion on an inner section, a ridged second engaging portion on an outer section, and ridged third and fourth engaging portions extending from the inner section to the outer section. When the ridged first and second engaging portions are partially disposed in the recessed first and second engaging portions respectively, one contacted area between the ridged third engaging portion and the recessed third engaging portion plus another contacted area between the ridged fourth engaging portion and the recessed fourth engaging portion preclude the cam device from suffering an increased pressure.

11 Claims, 13 Drawing Sheets

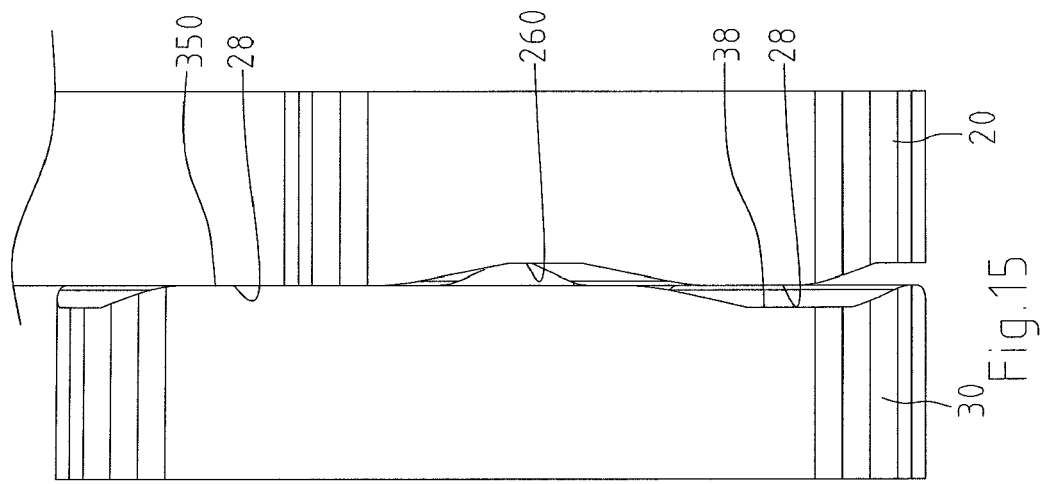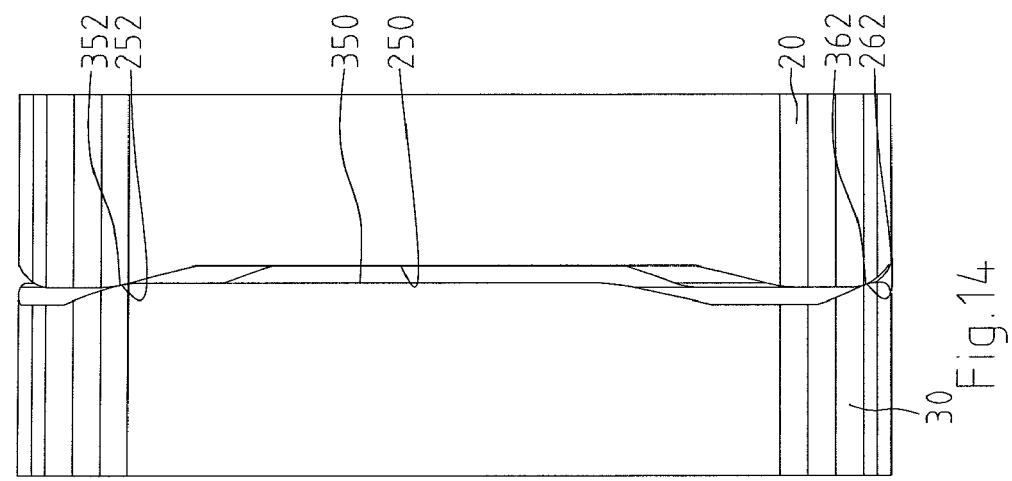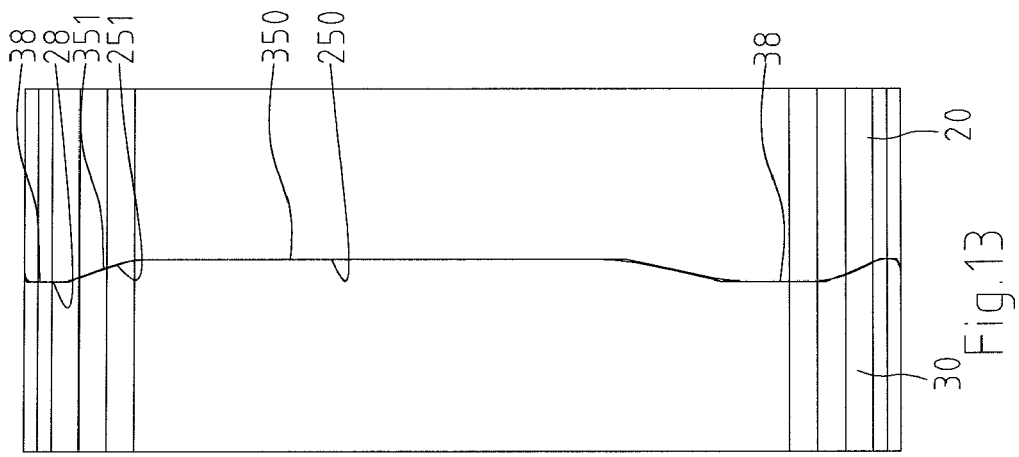

CAM DEVICE FOR A HINGE ASSEMBLY

BACKGROUND OF THE INVENTION

1. Field of the Invention

The present invention relates to a cam device and, in particular, to a cam device that has an extended life and that is for use in a hinge assembly incorporated in an electronic apparatus.

2. Description of the Related Art

Use of a cam device in a hinge assembly is already a known art. Referring to Taiwan Patent No. M244497, a laptop hinge assembly is incorporated with a cam device to allow the hinge assembly to be opened at various positions. The cam device includes a cam member and a cam follower rotatable relative to the cam member. The cam member includes a recess, and the cam follower includes a protrusion that selectively disposes in the recess. Moreover, the protrusion can be partially disposed in the recess at various extents to enable the hinge assembly to be opened at various positions. Also, when the protrusion is gradually rotated out of the recess, the cam follower will be gradually moved axially to press resilient members. At the same time, the resilient members will impart resilient force to urge the cam follower against the cam member.

Generally, when the protrusion is completely disposed out of the recess, the hinge assembly is fully opened. Also, the protrusion has a maximum area of contact to bear weight of a cover of the laptop, for instance. However, when the protrusion is partially disposed in the recess, a contacted area therebetween is reduced, but weight of the cover is the same. Therefore, an increased pressure exists in the cam device, which damages the cam device.

The present invention is, therefore, intended to obviate or at least alleviate the problems encountered in the prior art.

SUMMARY OF THE INVENTION

According to the present invention, there is provided a cam device for use in a hinge assembly having a first member including an inner section and an outer section extending from the inner section, a recessed first engaging portion extending on the inner section, a recessed second engaging portion extending on the outer section, and recessed third and fourth engaging portions extending from the inner section to the outer section. Further, a second member includes an inner section and an outer section extending from the inner section, a ridged first engaging portion extending on the inner section, a ridged second engaging portion extending on the outer section, and ridged third and fourth engaging portions extending from the inner section to the outer section. When the ridged first and second engaging portions are partially disposed in the recessed first and second engaging portions respectively, one contacted area between the ridged third engaging portion and the recessed third engaging portion plus another contacted area between the ridged fourth engaging portion and the recessed fourth engaging portion serves to preclude the cam device from suffering an increased pressure.

There has thus been outlined, rather broadly, the more important features of the invention in order that the detailed description thereof that follows may be better understood and in order that the present contribution to the art may be better appreciated. There are additional features of the invention that will be described hereinafter and which will form the subject matter of the claims appended hereto.

BRIEF DESCRIPTION OF THE DRAWINGS

For the present disclosure to be easily understood and readily practiced, the present disclosure will now be described in conjunction with the following figures, wherein;

FIG. 13 is an illustrative view of the cam device shown in FIG. 5.

FIG. 14 is an illustrative view of the cam device shown in FIG. 8.

FIG. 15 is an illustrative view of the cam device shown in FIG. 11.

DETAILED DESCRIPTION OF THE PREFERRED EMBODIMENT

Figure 1:
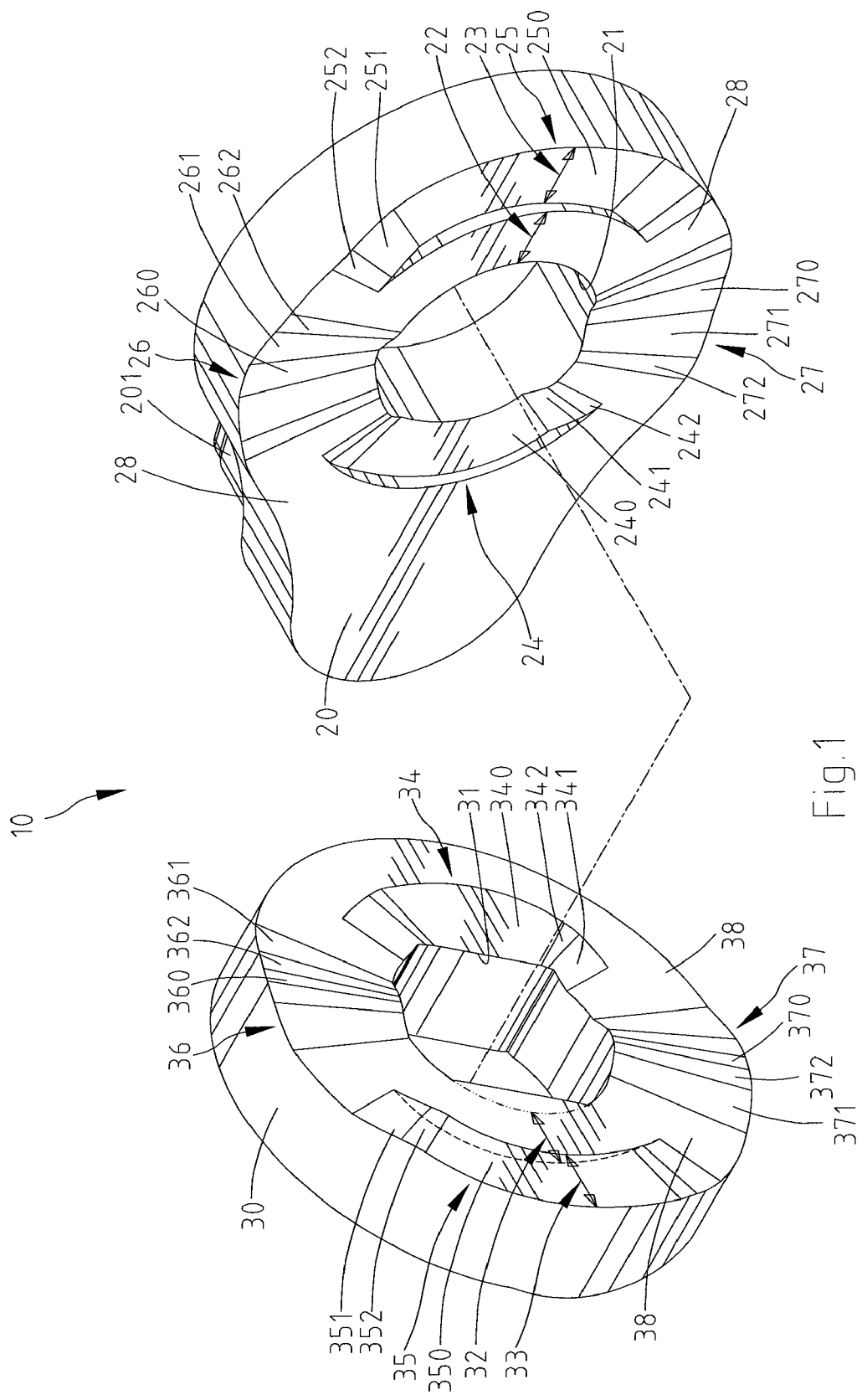
FIG. 1 is an exploded perspective view of a cam device in accordance with the present invention.
Figure 2:
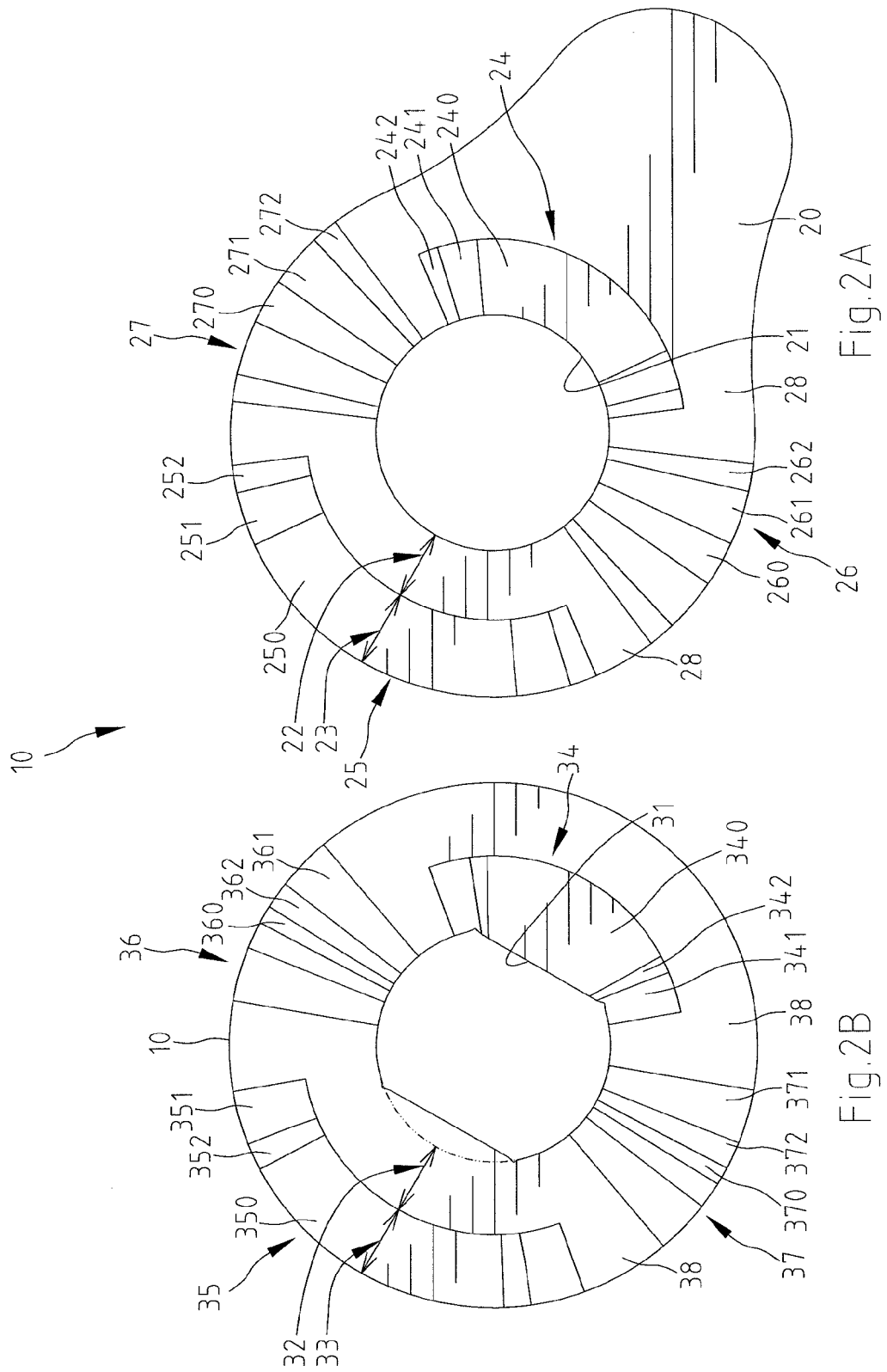
FIGS. 2a and 2b are side views of a first member and a second member of the cam device shown in FIG. 1.
Figure 3:
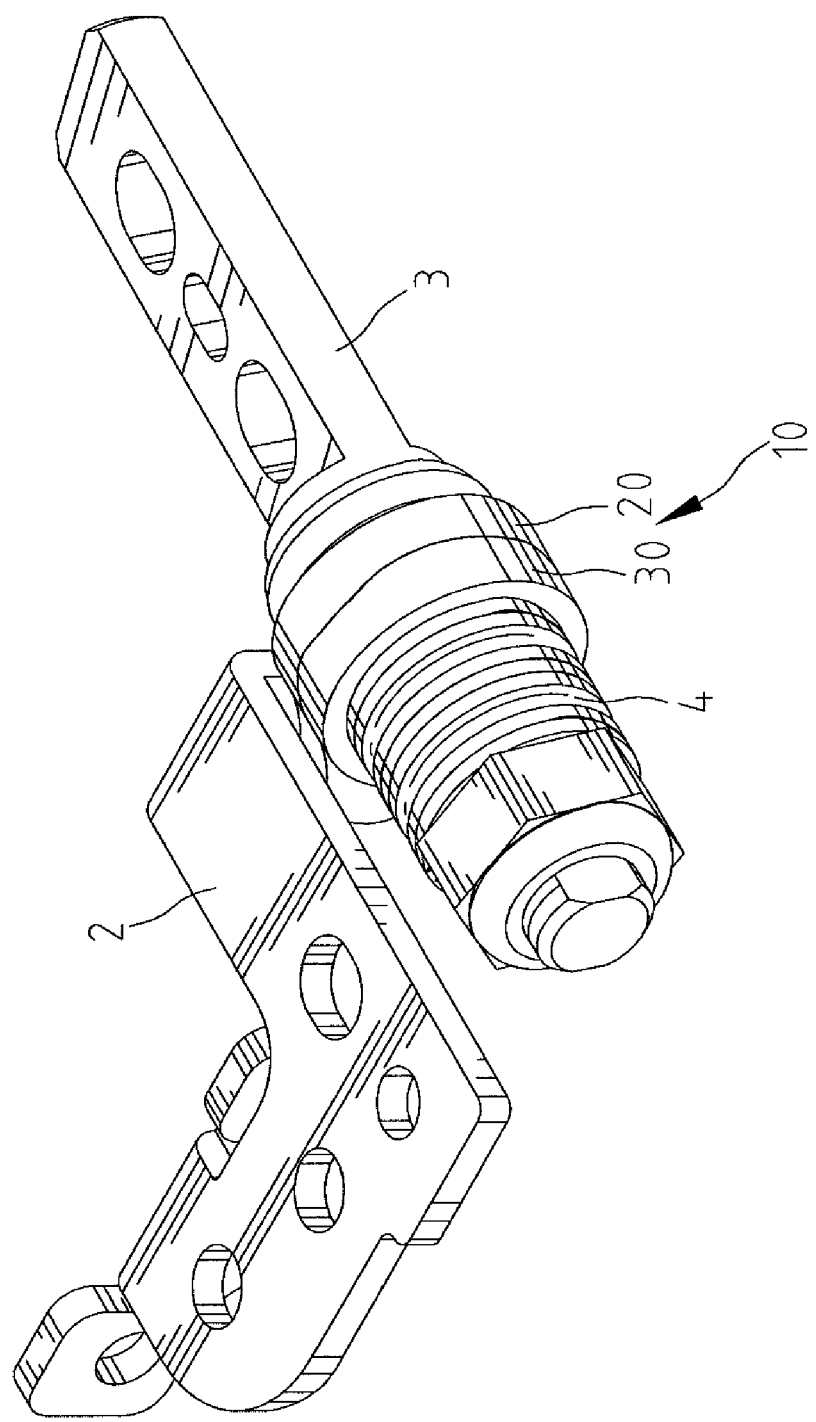
FIG. 3 is a perspective view of the cam device incorporated in a hinge assembly.
Figure 4:
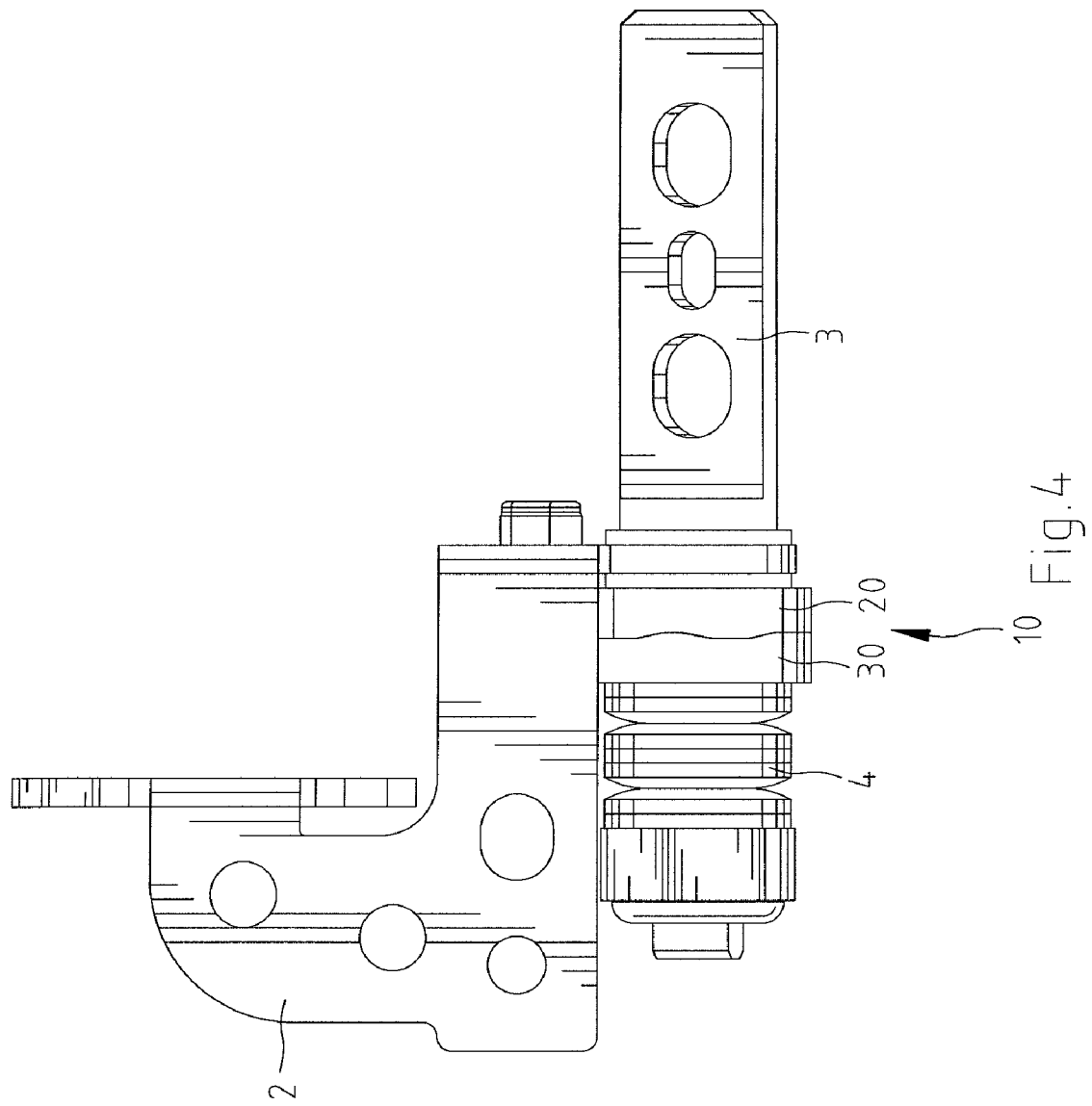
FIG. 4 is a top view of the hinge assembly shown in FIG. 3.
Figure 5:
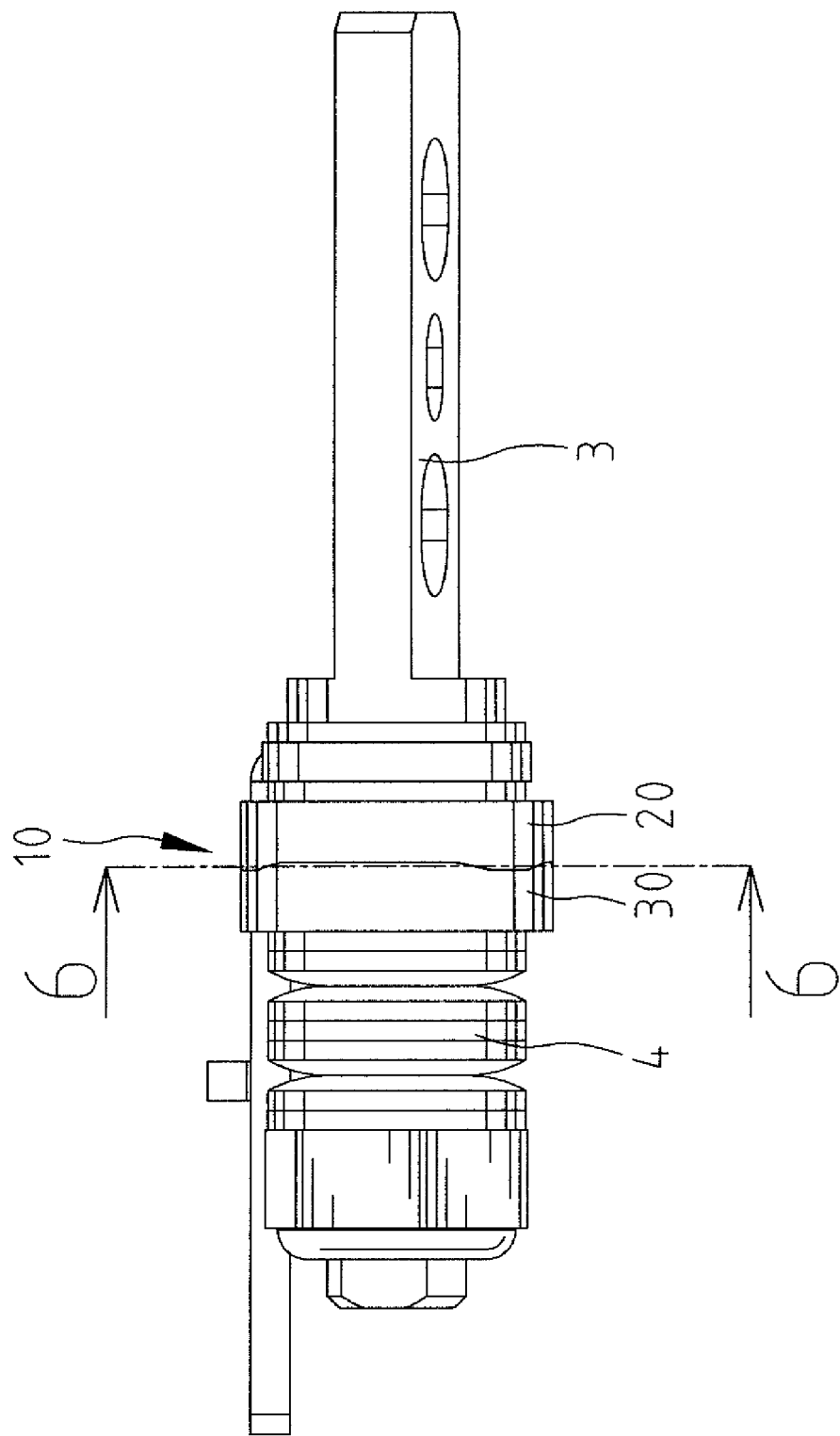
FIG. 5 is a front view of the hinge assembly shown in FIG. 3.
Figure 6:
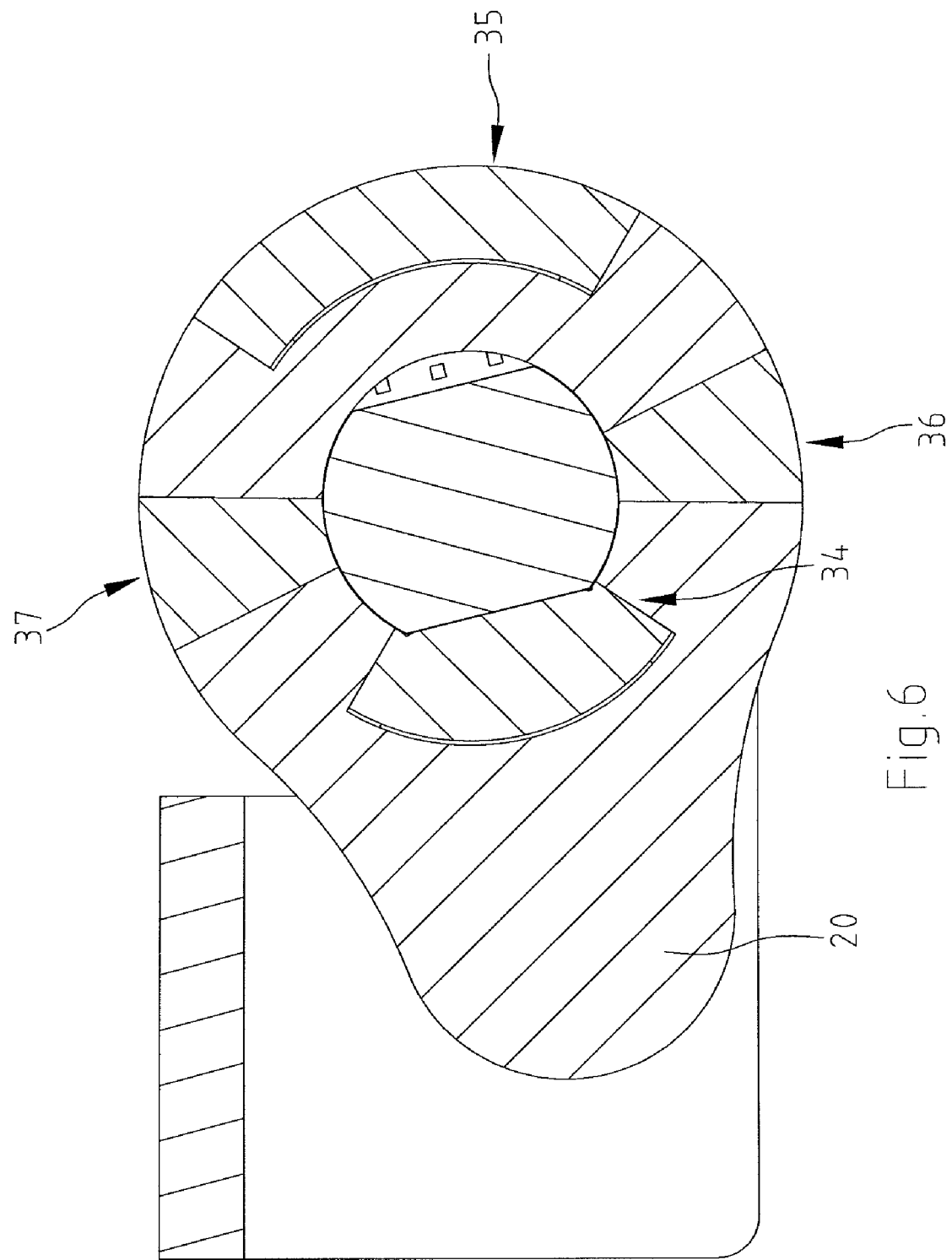
FIG. 6 is a cross-sectional view taken along line 6-6 of FIG. 5.
Figure 7:
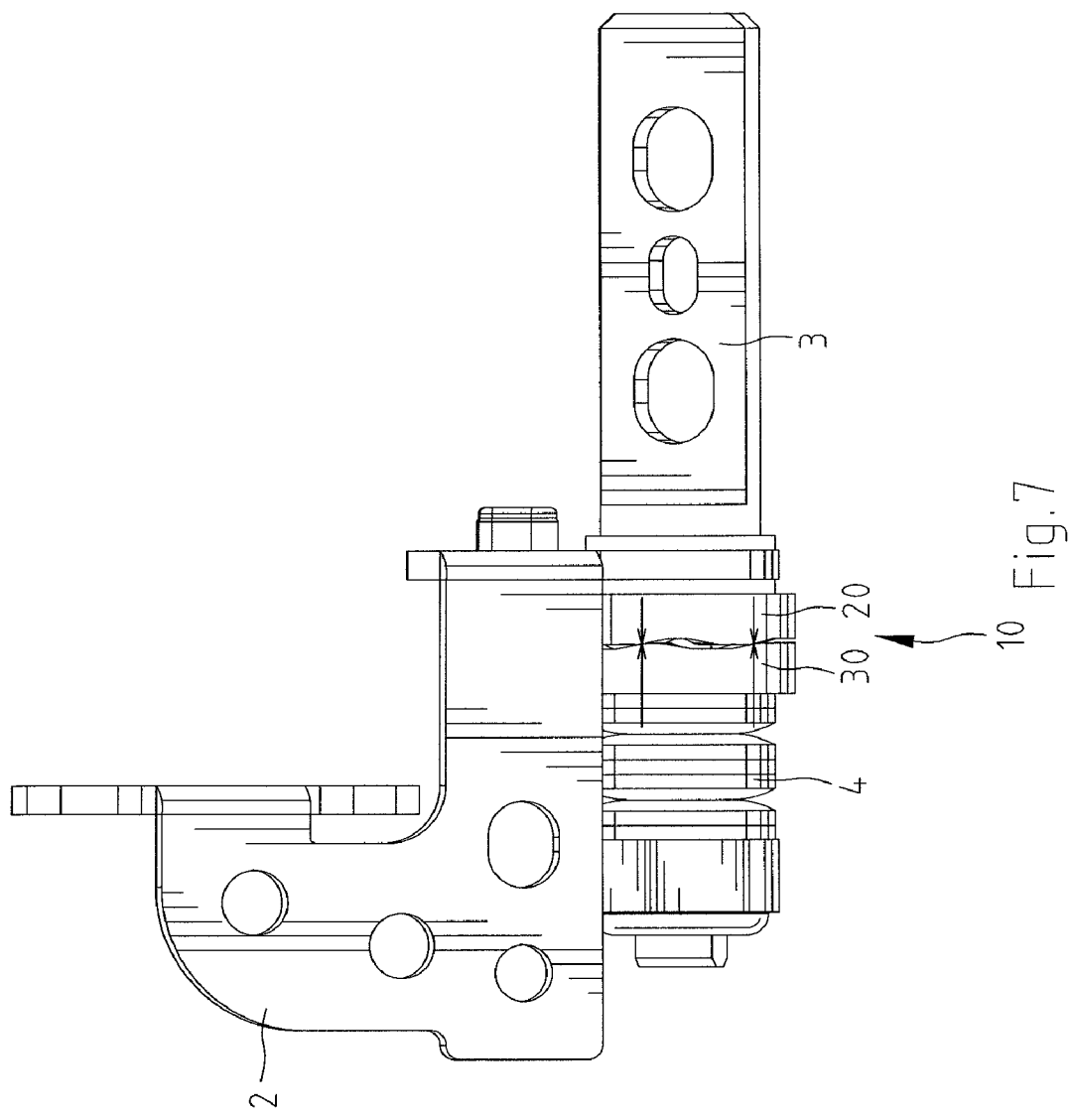
FIG. 7 is a top view similar to FIG. 4, but shows the hinge assembly opened to another position.
Figure 8:
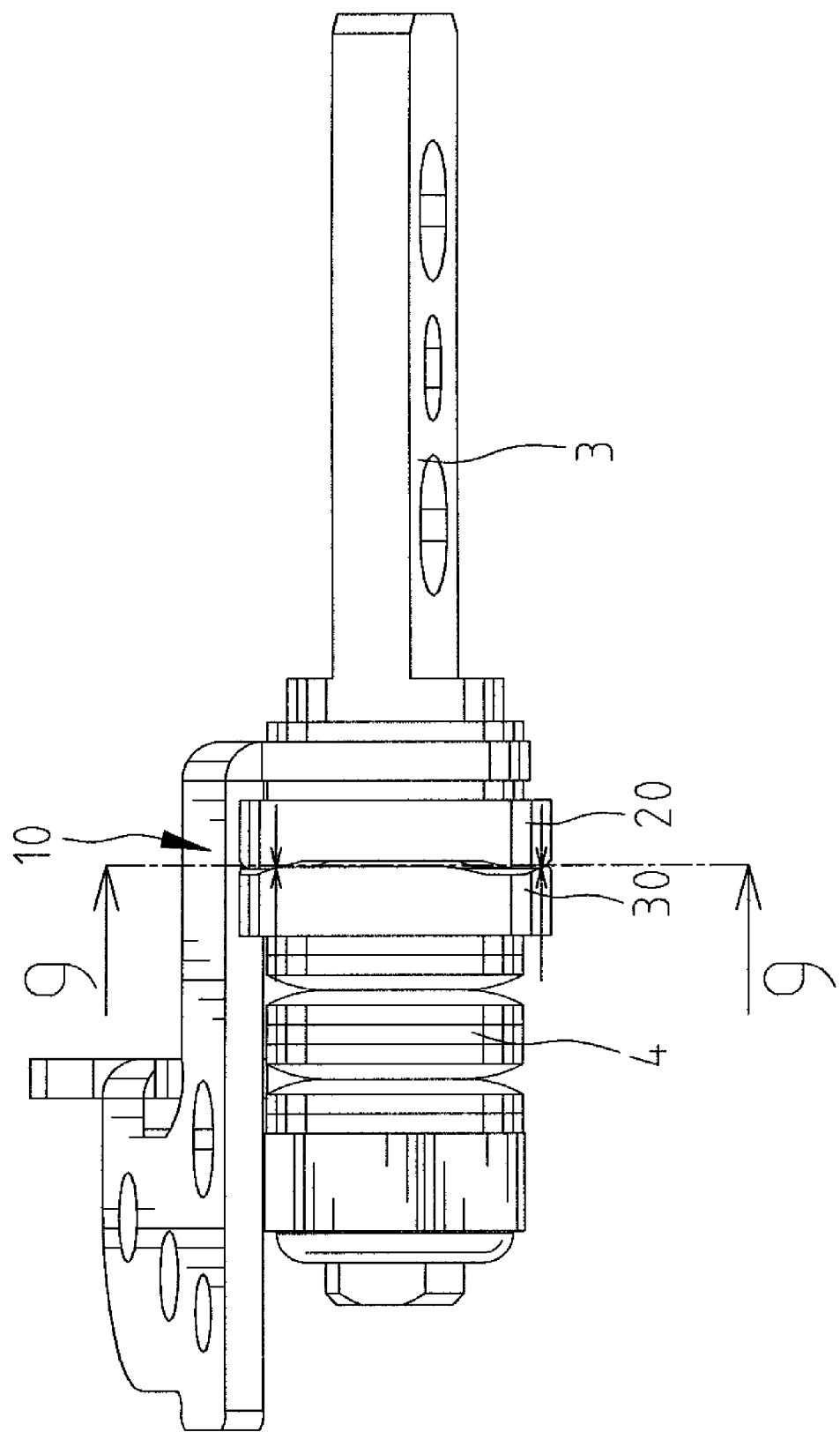
FIG. 8 is a front view of the of the hinge assembly shown in FIG. 7.
Figure 9:
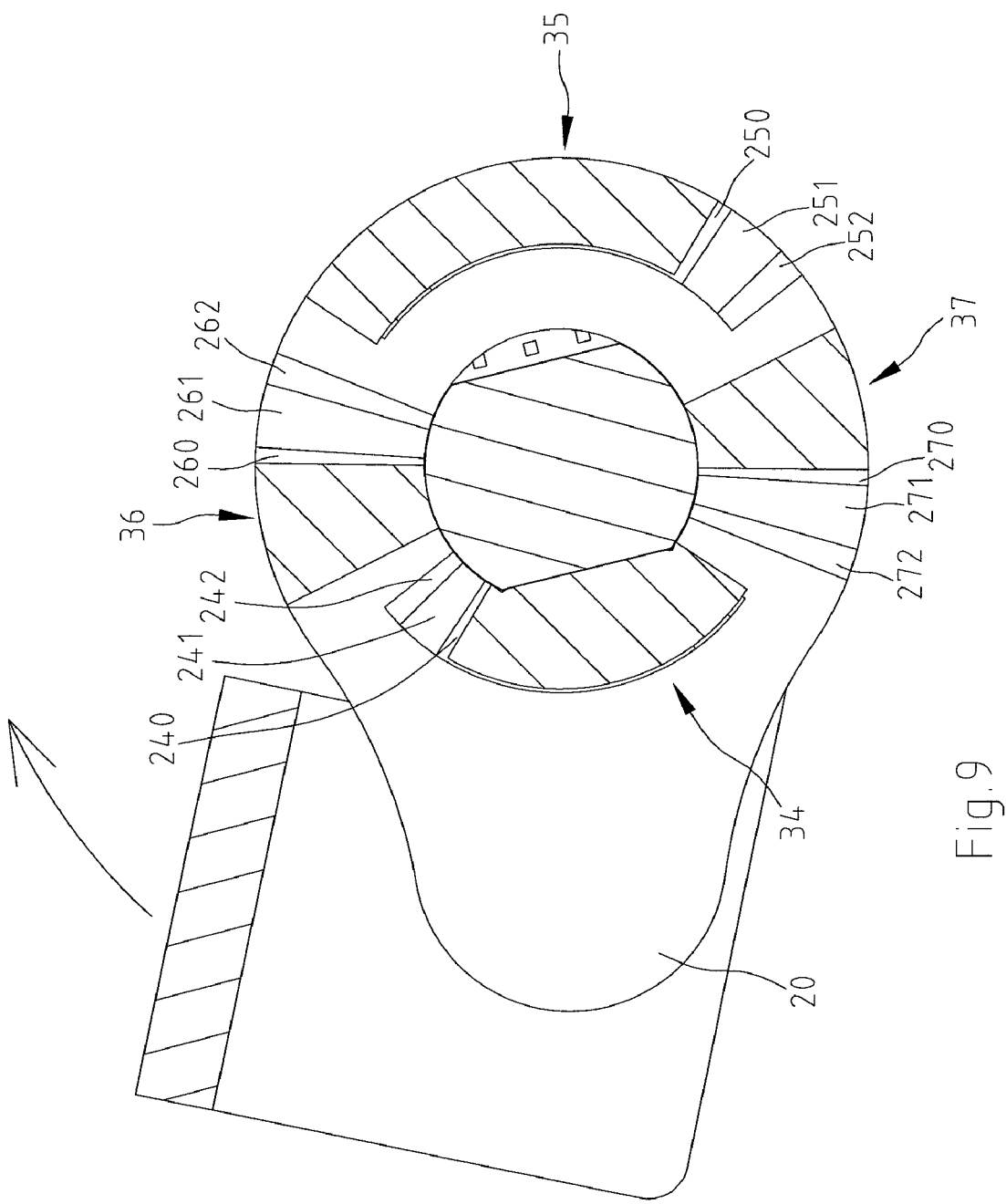
FIG. 9 is a cross-sectional view taken along line 9-9 of FIG. 8.
Figure 10:
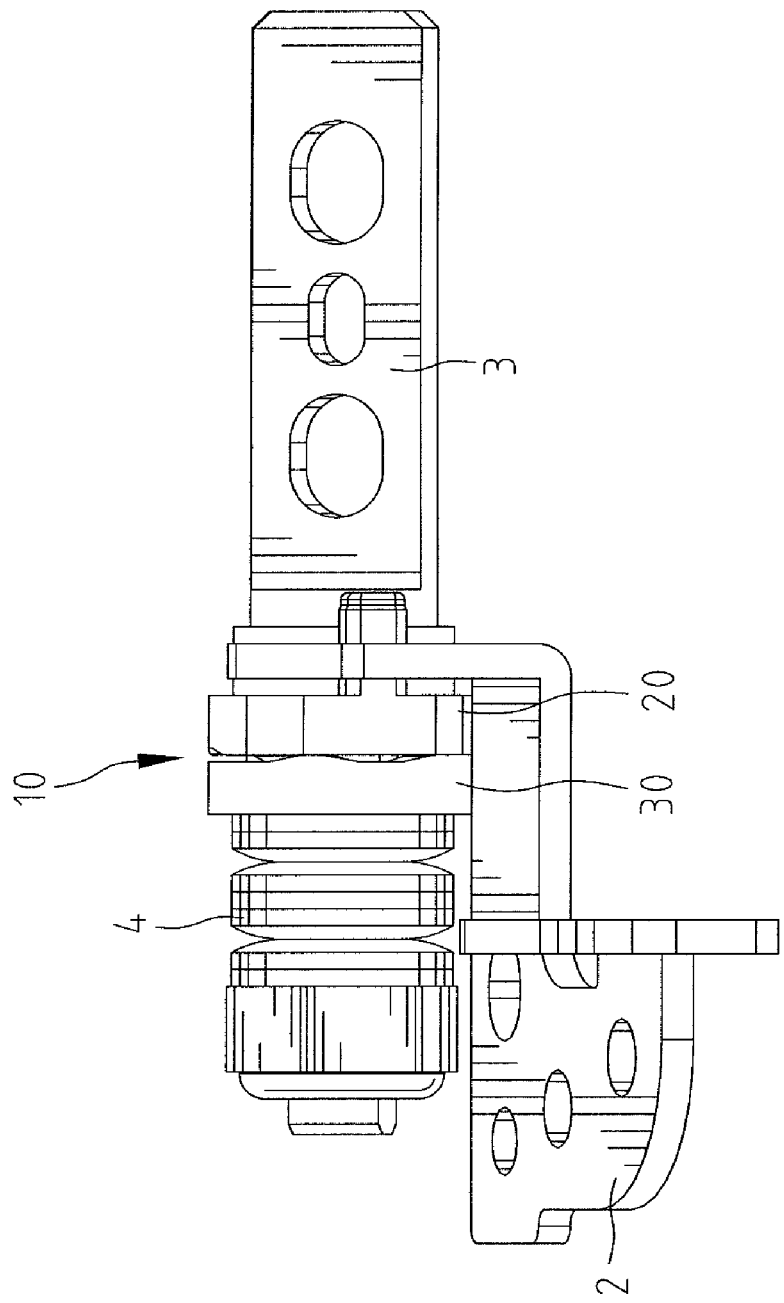
FIG. 10 is a top view similar to FIG. 4, but shows the hinge assembly opened to another position.
Figure 11:
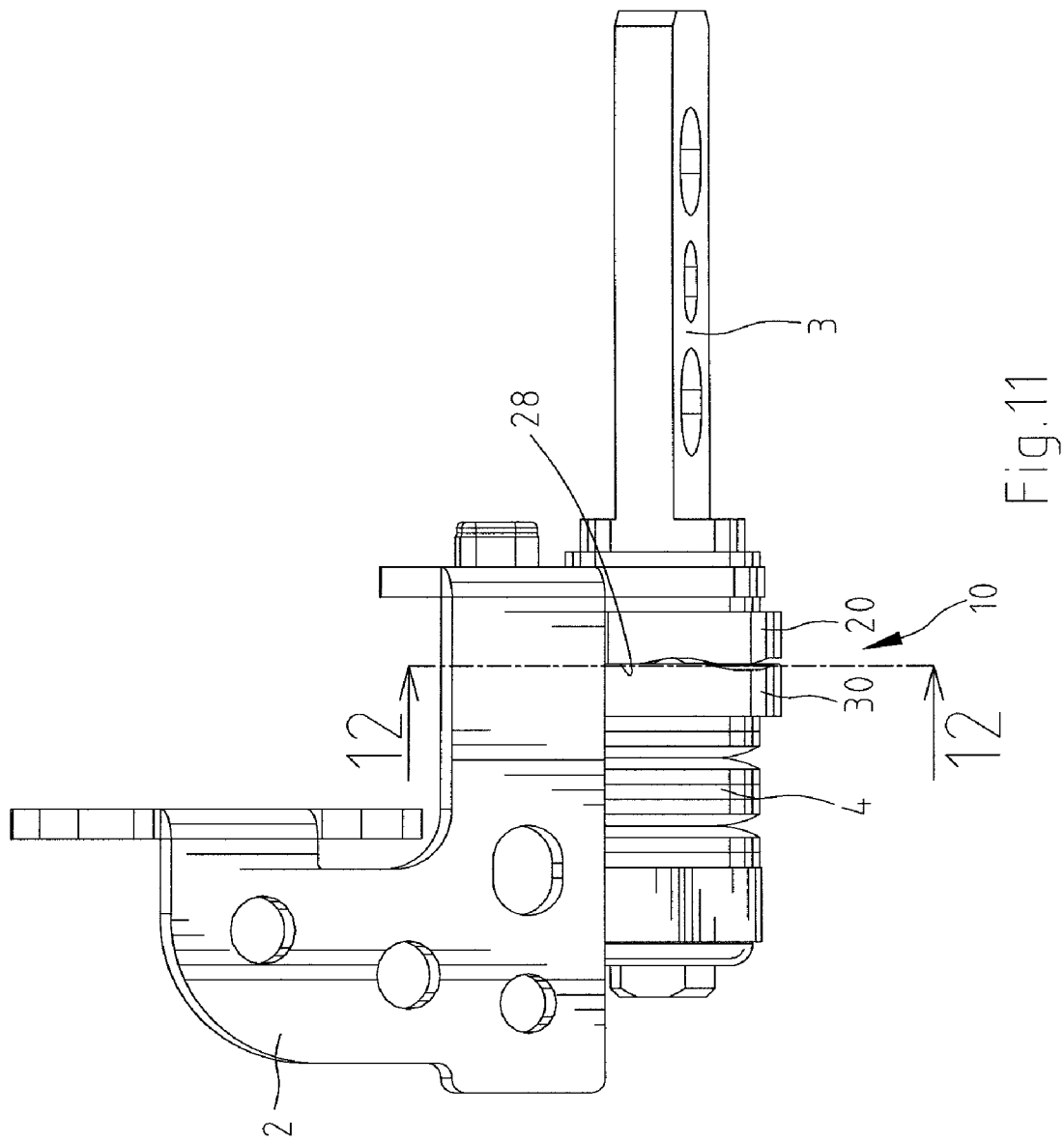
FIG. 11 is a front view of the hinge assembly shown in FIG. 10.
Figure 12:
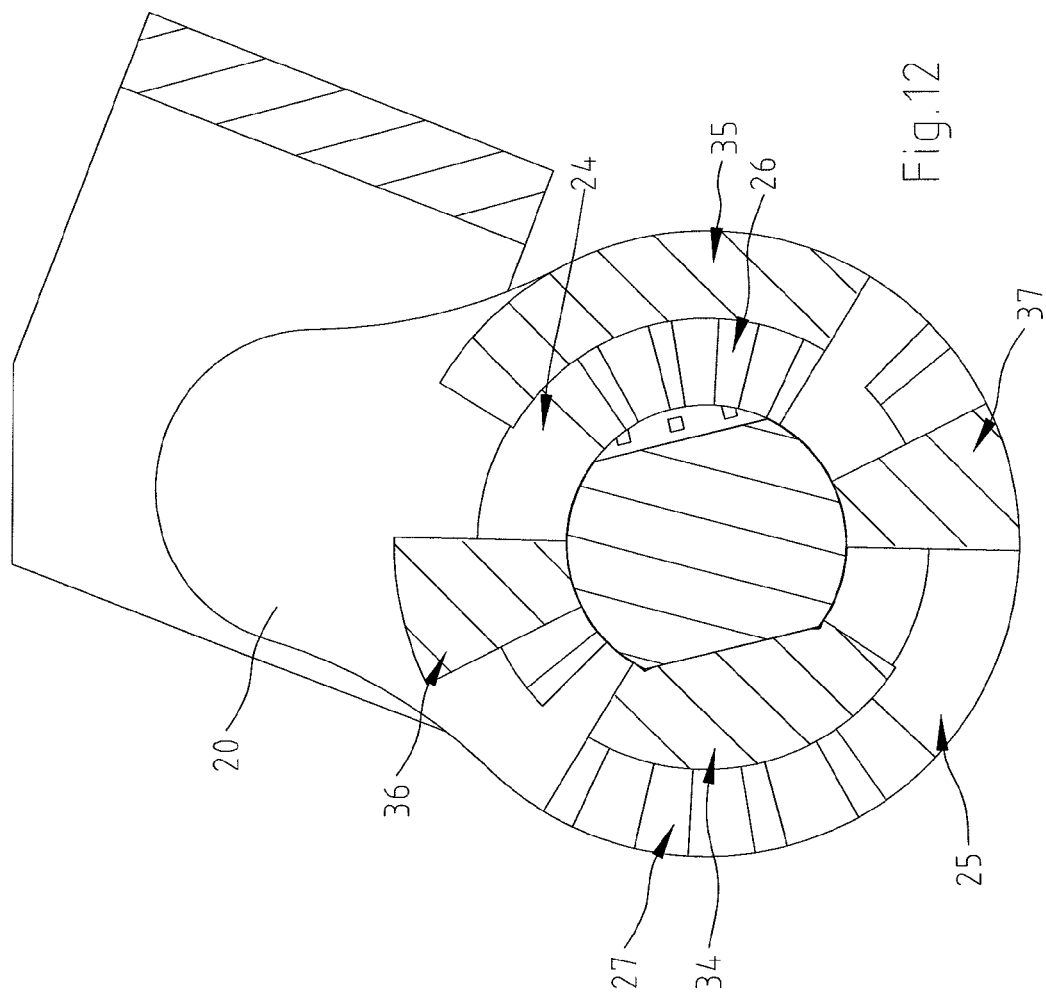
FIG. 12 is a cross-sectional view taken along line 12-12 of FIG. 11.

Referring to FIGS. 1 through 3, a cam device 10 for use in a hinge assembly, which is preferably incorporated in an electronic apparatus, includes a first member 20 and a second member 30. Preferably, the hinge assembly has a first coupling member 2 and a second coupling member 3. In this embodiment, the first and the second members 20 and 30 are coaxially positionable on the second coupling member 3 of the hinge assembly and biased together by a resilient member 4. Preferably, the second coupling member 3 has a pin structure inserted though a hole 21 in the first member 20 and a hole 31 in the second member 30. Preferably, the holes 21 and 31 are non-circular in order that friction between the holes 21 and 31 and the pin structure is alleviated. Additionally, the first member 20 has a hooking portion 201 connectable to a second coupling member 3 of the hinge assembly. It is understood that the function of operation of the first and second coupling members 2 and 3 are well known. Therefore, they are not further described.

The first member 20 has an engaging side 28, and the second member 30 has an engaging side 38 positioned against the engaging side 28 of the first member 20. Further, the engaging side 28 is moveable relative to the engaging side 38.

The engaging side 28 of the first member 20 defines a radially extended inner section 22 and a radially extended outer section 23. The inner section 22 has an inner perimeter that coincides with a perimeter of the hole 21 and an outer perimeter. The outer section 23 has an inner perimeter that coincides with the outer perimeter of the inner section 22 and an outer perimeter that coincides with a perimeter of the engaging side 28 of the first member 20.

The inner section 22 has a first engaging portion 24, which is preferably a recessed configuration, extending radially from the inner perimeter thereof to the outer perimeter thereof and defines a first edge 240, which is preferably a planar surface. One of two slopes 241 extends upward from an end of the first edge 240 and bridges the first edge 240 and the engaging side 28, and another of the two slopes 241 extends upward from another end of the first edge 240 and bridges the first edge 240 and the engaging side 28. One of two chamfered edges 242 interconnects one of the slopes 241 and the engaging side 28, and another of the two chamfered edges 242 interconnects another of the two slopes 241 and the engaging side 28. Thus, it is understood that sharp common edges between the slopes 241 and the engaging side 28 are avoided.

The outer section 23 has a second engaging portion 25, which is preferably a recessed configuration, extending radially from the inner perimeter thereof to the outer perimeter thereof and defines a first edge 250, which is preferably a planar surface. One of two slopes 251 extends upward from an end of the first edge 250 and bridges the first edge 250 and the engaging side 28, and another of the two slopes 251 extends upward from another end of the first edge 250 and bridges the first edge 250 and the engaging side 28. One of two chamfered edges 252 interconnects one of the slopes 251 and the engaging side 28, and another of the two chamfered edges 252 interconnects another of the two slopes 251 and the engaging side 28. Thus, it is understood that sharp common edges between the slopes 251 and the engaging side 28 are avoided.

In addition, the first engaging portion 24 has an area, and the second engaging portion 25 has an area larger than that of the first engaging portion 24. Further, the first engaging portion 24 and the second engaging portion 25 are disposed at opposite sides of the hole 21. Further, the first engaging portion 24 has an inner angular distance and the second engaging portion 25 has an inner angular distance larger than that of the first engaging portion 24. Further, the first engaging portion 24 has an outer angular distance, and the second engaging portion 25 has an outer angular distance larger than that of the first engaging portion 24.

The engaging side 28 of the first member 20 further includes a third engaging portion 26 and a fourth engaging portion 27 disposed at opposite sides of the hole 21.

The third engaging portion 26, which is preferably a recessed configuration, extends radially from the inner perimeter of the inner section 22 to the outer perimeter of the outer section 23 and defines a first edge 260, which is preferably a planar surface. One of two slopes 261 extends upward from an end of the first edge 260 and bridges the first edge 260 and the engaging side 28, and another of the two slopes 261 extends upward from another end of the first edge 260 and bridges the first edge 260 and the engaging side 28. One of two chamfered edges 262 interconnects one of the slopes 261 and the engaging side 28, and another of the two chamfered edges 262 interconnects another of the two slopes 261 and the engaging side 28. Thus, it is understood that sharp common edges between the slopes 261 and the engaging side 28 are avoided.

The fourth engaging portion 27, which is preferably a recessed configuration, extends radially from the inner perimeter of the inner section 22 to the outer perimeter of the outer section 23 and defines a first edge 270, which is preferably a planar surface. One of two slopes 271 extends upward from an end of the first edge 270 and bridges the first edge 270 and the engaging side 28, and another of the two slopes 271 extends upward from another end of the first edge 270 and bridges the first edge 270 and the engaging side 28. One of two chamfered edges 272 interconnects one of the slopes 271 and the engaging side 28, and another of the two chamfered edges 272 interconnects another of the two slopes 271 and the engaging side 28. Thus, it is understood that sharp common edges between the slopes 271 and the engaging side 28 are avoided.

In addition, the third engaging portion 26 has an area, and the fourth engaging portion 27 has an area substantially equal to that of the third engaging portion 26. Further, the third engaging portion 26 has an inner angular distance, and the fourth engaging portion 27 has an inner angular distance substantially equal to that of the third engaging portion 26. The inner angular distances of the third and fourth engaging portions 26 and 27 are smaller than those of the first and second engaging portions 24 and 25. Further, the third engaging portion 26 has an outer angular distance, and the fourth engaging portion 27 has an outer angular distance equal to the third engaging portion 26. The outer angular distances of the third and fourth engaging portions 26 and 27 are smaller than those of the first and second engaging portions 24 and 25.

The engaging side 38 of the second member 30 defines a radially extended inner section 32 and a radially extended outer section 33. The inner section 32 has an inner perimeter that coincides with a perimeter of the hole 31 and an outer perimeter. The outer section 23 has an inner perimeter that coincides with the outer perimeter of the inner section 32 and an outer perimeter that coincides with a perimeter of the engaging side 38 of the first member 20.

The inner section 32 has a first engaging portion 34, which is preferably a ridge, extending radially from the inner perimeter thereof to the outer perimeter thereof and defines a first edge 340, which is preferably a planar surface. One of two slopes 341 extends upward from the engaging side 38 and bridges the engaging side 38 and an end of the first edge 340, and another of the two slopes 341 extends upward from the engaging side 38 and bridges the engaging side 38 and another end of the first edge 340. One of two chamfered edges 342 interconnects one of the slopes 341 and the first edge 340, and another of the two chamfered edges 342 interconnects another of the two slopes 341 and the first edge 340. Thus, it is understood that sharp common edges between the slopes 341 and the first edge 340 are avoided.

The outer section 33 has a second engaging portion 35, which is preferably a ridge, extending radially from the inner perimeter thereof to the outer perimeter thereof and defines a first edge 350, which is preferably a planar surface. One of two slopes 351 extends upward from the engaging side 38 and bridges the engaging side 38 and an end of the first edge 350, and another of the two slopes 351 extends upward from the engaging side 38 and bridges the engaging side 38 and another end of the first edge 350. One of two chamfered edges 352 interconnects one of the slopes 351 and the first edge 350, and another of the two chamfered edges 352 interconnects another of the two slopes 351 and the first edge 350. Thus, it is understood that sharp common edges between the slopes 351 and the first edge 350 are avoided.

In addition, the first engaging portion 34 has an area, and the second engaging portion 35 has an area larger than the first engaging portion 34. Additionally, the area of the first engaging portion 34 is substantially equal to the area of the first engaging portion 24 of the first member 20. The area of the second engaging portion 35 is substantially equal to the area of the second engaging portion 25 of the first member 20. Further, the first engaging portion 34 and the second engaging portion 35 are disposed at opposite sides of the hole 31. Further, the first engaging portion 34 has an inner angular distance and the second engaging portion 35 has an inner angular distance larger than the first engaging portion 34. Further, the first engaging portion 34 has an outer angular distance, and the second engaging portion 35 has an outer angular distance larger than the first engaging portion 34.

The engaging side 38 of the second member 30 further includes a third engaging portion 36 and a fourth engaging portion 37 disposed at opposite sides of the hole 31.

The third engaging portion 36, which is preferably a recessed configuration, extends radially from the inner perimeter of the inner section 32 to the outer perimeter of the outer section 33 and defines a first edge 360, which is preferably a planar surface. One of two slopes 361 extends upward from the engaging side 38 and bridges the engaging side 38 and an end of the first edge 360, and another of the two slopes 361 extends upward from the engaging side 38 and bridges the engaging side 38 and another end of the first edge 360. One of two chamfered edges 362 interconnects the one of the slopes 361 and the first edge 360, and another of the two chamfered edges 362 interconnects another of the two slopes 361 and the first edge 360. Thus, it is understood that sharp common edges between the slopes 361 and the first edge 360 are avoided.

The fourth engaging portion 37, which is preferably a recessed configuration, extends radially from the inner perimeter of the inner section 32 to the outer perimeter of the outer section 33 and defines a first edge 370, which is preferably a planar surface. One of two slopes 371 extends upward from the engaging side 38 and bridges the engaging side 38 and an end of the first edge 370, and another of the two slopes 371 extends upward from the engaging side 38 and bridges the engaging side 38 and another end of the first edge 370. One of two chamfered edges 372 interconnects one of the slopes 371 and the first edge 370, and another of the two chamfered edges 372 interconnects another of the two slopes 371 and the first edge 370. Thus, it is understood that sharp common edges between the slopes 371 and the first edge 370 are avoided.

In addition, the third engaging portion 36 has an area, and the fourth engaging portion 37 has an area substantially equal to the third engaging portion 36. Further the area of the third engaging portion 36 is substantially equal to the third engaging portion 26 and the fourth engaging portion 27 of the first member 20. Further, the third engaging portion 36 has an inner angular distance and the fourth engaging portion 37 has an inner angular distance equal to that of the third engaging portion 36. The inner angular distances of the third and fourth engaging portions 36 and 37 are smaller than those of the first and second engaging portions 34 and 35. Further, the third engaging portion 36 has an outer angular distance, and the fourth engaging portion 37 has an outer angular distance equal to the third engaging portion 36. The outer angular distances of the third and fourth engaging portions 36 and 37 are smaller than those of the first and second engaging portions 34 and 35.

Referring to FIGS. 4 through 6 and 13, the first, second, third and fourth engaging portions 24, 25, 26, and 27 of the first member 20 are disposed in the first, second, third and fourth engaging portions 34, 35, 36, and 37 of the second member 30, respectively. Referring to FIGS. 7 through 9 and 14, the engaging portions 24, 25, 26, and 27 of the first member 20 are rotated out of and partially disposed in the first, second, third and fourth engaging portions 34, 35, 36, and 37 of the second member 30, respectively. It is understood that a contacted area between the third engaging portion 26 of the first member 20 and the third engaging portion 36 of the second member 30 plus a contacted area between the fourth engaging portion 27 of the first member 20 and the fourth engaging portion 37 of the second member 30 have an amount which is substantially equal to two times of a contacted area between the first engaging portion 24 of the first member 20 and the first engaging portion 34 of the second member 30 plus a contacted area between the second engaging portion 25 of the first member 20 and the second engaging portion 35 of the second member 30. Thus, if the first and second engaging portions 34 and 35 are partially disposed in the first and second engaging portions 24 and 25, the cam device 10 is precluded from suffering an increased pressure, as described in the Description of the Related Art.

Additionally, it is understood that the chamfered edges 242, 252, 262, 272, 342, 352, 362, and 372 are adapted to prevent the first, second, third and fourth engaging portions 24, 25, 26, and 27 of the first member 20 to jump abruptly out of the first, second, third and fourth engaging portions 34, 35, 36, and 37 of the second member 30, respectively.

FIGS. 10 through 12 and 15 show the second member 30 rotated to another position relative to the first member 20, and the engaging portions 24, 25, 26, and 27 of the first member 20 are disposed out of the first, second, third and fourth engaging portions 34, 35, 36, and 37 of the second member 30. Additionally, the first and the second engaging portions 34 and 35 of the second member 30 are adapted to be positioned against the engaging side 28 of the first member 20. The third and fourth engaging portions 36 and 37 are also adapted to be positioned against the engaging side 28 of the first member 20.

From the forgoing, it is an objective of the present invention that the cam device 10 of the present invention has an extended life as an increased pressure is precluded.

It is another objective of the present invention that the first engaging portion 34 of the second member 30 is prevented from locating in any of the recessed engaging portions 25, 26, 27 on the engaging side 28 of the first member 20 other than the first engaging portion 24, and the second engaging portion 35 of the second member 30 is prevented from locating in any of the recessed engaging portions 24, 26, 27 on the engaging side 28 of the first member 20 other than the second engaging portion 25.

While the specific embodiments have been illustrated and described, numerous modifications come to mind without significantly departing from the spirit of invention, and the scope of invention is only limited by the scope of the accompanying claims.

What is claimed is:

1. A cam device for use in a hinge assembly comprising:
   a first member including a first engaging side including a radially extended inner section and an outer section extending radially from the inner section, a recessed first engaging portion extending radially on the inner section, a recessed second engaging portion extending radially on the outer section, and recessed third and fourth engaging portions extending radially from the inner section to the outer section; and
   a second member including a second engaging side including a radially extended inner section and an outer section extending radially from the inner section, a ridged first engaging portion extending radially on the inner section, a ridged second engaging portion extending radially on the outer section, and ridged third and fourth engaging portions extending radially from the inner section to the outer section;
   wherein the ridged first, second, third and fourth engaging portions are adapted to be completely received in the recessed first, second, third, fourth engaging portions, respectively, and the ridged first engaging portion is prevented from locating in any of the recessed engaging portions other than the recessed first engaging portion, and the second ridged engaging portion is prevented from locating in any of the recessed engaging portions other than the second engaging portion;
   wherein the ridged first, second, third and fourth engaging portions are adapted to be partially received in the recessed first, second, third, fourth engaging portions respectively, and when the ridged first and second engaging portions are partially disposed in the recessed first and second engaging portions respectively, a first contacted area between the ridged third engaging portion and the recessed third engaging portion plus a second contacted area between the ridged fourth engaging portion and the recessed fourth engaging portion is substantially equal to two times a third contacted area between the recessed first engaging portion and the ridged first engaging portion plus a fourth contacted area between the recessed second engaging portion and the ridged second engaging portion to preclude the cam device from suffering an increased pressure.

2. The cam device according to claim 1 wherein the recessed first and second engaging portion are defined on the first engaging side and each comprises a first edge, one of two slopes extending upward from an end of the first edge and bridging the first edge and the first engaging side, and another of the two slopes extending upward from another end of the first edge and bridging the first edge and the first engaging side, and one of two chamfered edges interconnecting one of the slopes and the first engaging side, and another of the two chamfered edges interconnecting another of the two slopes and the first engaging side.

3. The cam device as claimed in claim 2 wherein the recessed first engaging portion has an area and the recessed second engaging portion has an area larger than that of the recessed first engaging portion, and wherein the recessed first engaging portion has an inner angular distance and the recessed second engaging portion has an inner angular distance larger than that of the recessed first engaging portion, and wherein the recessed first engaging portion has an outer angular distance and the recessed second engaging portion has an outer angular distance larger than that of the recessed first engaging portion.

4. The cam device as claimed in claim 2 wherein the recessed third and fourth engaging portions are defined on the first engaging side and each comprises a first edge, one of two slopes extending upward from an end of the first edge and bridging the first edge and the first engaging side, and another of the two slopes extending upward from another end of the first edge and bridging the first edge and the first engaging side, one of two chamfered edges interconnecting one of the slopes and the first engaging side, and another of the two chamfered edges interconnects another of the two slopes and the first engaging side.

5. The cam device as claimed in claim 4 wherein the recessed third engaging portion has an area and the recessed fourth engaging portion has an area substantially equal to that of the recessed third engaging portion, and wherein the recessed third engaging portion has an inner angular distance and the recessed fourth engaging portion has an inner angular distance substantially equal to that of the recessed third engaging portion, and wherein the recessed third engaging portion has an outer angular distance and the recessed fourth engaging portion has an outer angular distance substantially equal to that of the recessed third engaging portion.

6. The cam device as claimed in claim 5 wherein the recessed first engaging portion has a first inner angular distance and the recessed second engaging portion has a second inner angular distance, respectively, and wherein the inner angular distances of the recessed third and fourth engaging portions are smaller than the first and second inner angular distances, and wherein the recessed first engaging portion has a first outer angular distance and the recessed second engaging portion has a second outer angular distance, respectively, and wherein the outer angular distances of the recessed third and fourth engaging portions are smaller than the first and second outer angular distances.

7. The cam device as claimed in claim 2 wherein the ridged first and second engaging portion are defined on the second engaging side and each comprises a first edge, one of two slopes extending upward from the second engaging side and bridging the second engaging side and an end of the first edge, and another of the two slopes extending upward from the second engaging side and bridging the second engaging side and another end of the first edge, and one of two chamfered edges interconnecting one of the slopes and the first edge, and another of the two chamfered edges interconnecting another of the two slopes and the first edge.

8. The cam device as claimed in claim 7 wherein the ridged first engaging portion has an area and the ridged second engaging portion has an area larger than that of the ridged first engaging portion, and wherein the ridged first engaging portion has an inner angular distance and the ridged second engaging portion has an inner angular distance larger than that of the ridged first engaging portion, and wherein the ridged first engaging portion has an outer angular distance and the ridged second engaging portion has an outer angular distance larger than that of the ridged first engaging portion.

9. The cam device as claimed in claim 7 wherein the ridged third and fourth engaging portions are defined on the second engaging side and each comprises a first edge, one of two slopes extending upward from the second engaging side and bridging the second engaging side and an end of the first edge, and another of the two slopes extending upward from the second engaging side and bridging the second engaging side and another end of the first edge, and one of two chamfered edges interconnecting one of the slopes and the first edge, and another of the two chamfered edges interconnecting another of the two slopes and the first edge.

10. The cam device as claimed in claim 9 wherein the ridged third engaging portion has an area and the ridged fourth engaging portion has an area substantially equal to that of the ridged third engaging portion, and wherein the ridged third engaging portion has an inner angular distance and the ridged fourth engaging portion has an inner angular distance substantially equal to that of the ridged third engaging portion, and wherein the ridged third engaging portion has an outer angular distance and the ridged fourth engaging portion has an outer angular distance substantially equal to that of the recessed third engaging portion.

11. The cam device as claimed in claim 10 wherein the ridged first engaging portion has a first inner angular distance and the ridged second engaging portion has a second inner annular distance, respectively, and wherein the inner angular distances of the ridged third and fourth engaging portions are smaller than the first and second inner angular distances, and wherein the ridged first engaging portion has a first outer angular distance and the ridged second engaging portion has a second outer angular distance, respectively, and wherein the outer angular distances of the ridged third and fourth engaging portions are smaller than the first and second outer angular distances.

* * * * *